United States Patent Office

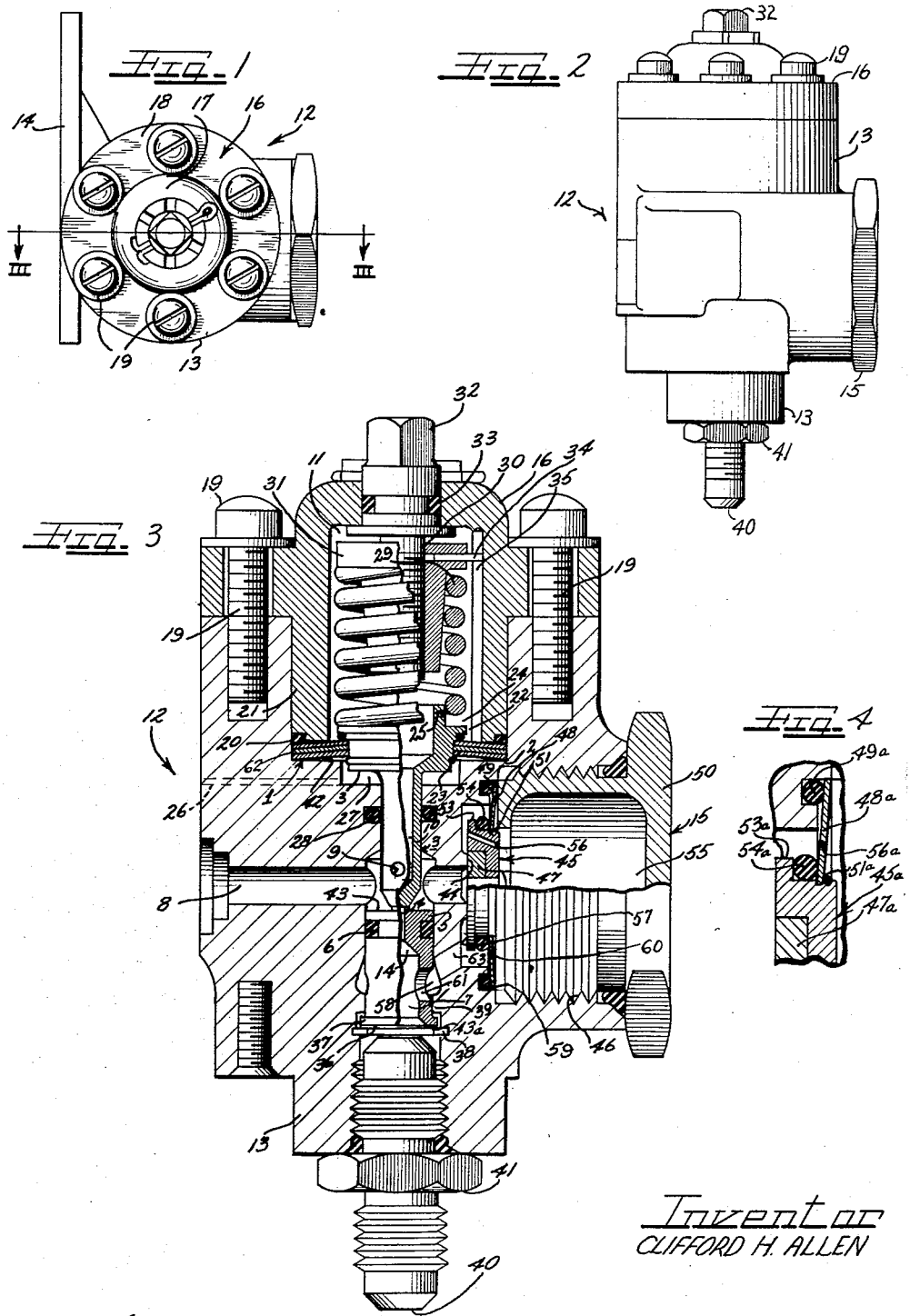

2,953,152
Patented Sept. 20, 1960

2,953,152
PRESSURE REGULATING VALVE

Clifford H. Allen, Cleveland, Ohio, assignor to Thompson Ramo Wooldridge Inc., a corporation of Ohio Filed Aug. 17, 1956, Ser. No. 604,850

6 Claims. (Cl. 137—110)

The present invention relates to improvements in pressure regulating valves and more specifically to a valve for regulating the pressure level of compressed gas delivered to an actuator at a constant value regardless of variations in supply pressure and for delivering compressed gas at an initial high pressure level during a starting period.

By way of specific example, the present invention may be employed in a rocket system wherein the exhaustible compressed gas supply is originally under high pressure and the pressure diminishes as the compressed gas supply is consumed and wherein a high initial supply of compressed gas must be furnished to obtain the desired initial acceleration to attain running speed in a very short interval of time.

In the present invention, a pressure regulating valve and a valve for supplying high initial compressed gas requirements are combined in a co-operative unit. The unit includes a regulator body having an inlet port and an outlet port with passageways communicating therebetween. In one passageway is positioned a pressure regulator valve means which functions to maintain a constant pressure at the outlet port of the valve body regardless of fluctuations in upstream and downstream pressure. A second larger by-pass passageway is provided extending around the regulator valve for supplying the high initial pressure requirements. This passageway is provided with a time-delay controlled valve unit which automatically opens at the beginning of an operating cycle and automatically closes at the end of the initial or starting cycle.

A primary objective of the invention is to provide a regulating valve which will cause extremely rapid acceleration of an actuator, such as a compressed gas driven turbine to cause it to reach operating speed in a very short time interval, and immediately thereafter to control the turbine speed at a constant level by regulating the gas pressure at the turbine inlet orifice within close limits.

Another object of the invention is to provide a regulating valve of a type described wherein a pressure regulating valve and a by-pass valve are combined for a co-operative action to supply compressed gas from a single source to a point of delivery and which may be housed in a simplified unit valve body.

A more specific objective of the invention is to provide a combination pressure regulating valve and by-pass valve wherein the pressure regulating valve is temporarily inactive during the time the compressed gas is supplied through the by-pass valve and wherein the pressure regulating valve is prevented from being damaged due to high pressures and pressure fluctuations.

Another object of the invention is to provide a multipurpose valve wherein one of the valve units will automatically open with a pressure differential across it, and will automatically close after a predetermined time delay.

Another object of the invention is to provide a multipurpose valve wherein one of the pressure control units is responsive to pressure of the supply fluid and is adjustably controllable to supply a constant pressure of fluid over wide variations of supply pressure.

Another object of the invention is to provide an improved valve-controlling time delay element which utilizes the pressures of the flow of fluid to the valve to control the operation of the valve and to determine the time delay between movements of the valve.

Other objects and advantages will become more apparent to those skilled in the art and to those who obtain a complete teaching of the principles of the invention from the apparatus and methods disclosed in the specification, claims and in the appended drawings, in which:

Figure 1 is a plan view illustrating the external appearance of the top of the valve body;

Figure 2 is a side elevational view of the valve body;

Figure 3 is a sectional view taken along line III—III of Figure 1, illustrating the valve in enlarged sectional view to show the internal details of the various valve features; and, Figure 4 is a detailed sectional view of an alternative embodiment of an element of the valve.

The valve is shown as operative to control a flow of compressed fluid or gas and may be utilized in the form shown as the preferred embodiment to control the operation of a power system such as a turbine. It will be understood, however, that while the principles of the invention find particular utility in the embodiment shown and are useful in the environment illustrated and referred to, the features and principles of the invention may be used in other systems and arrangements taking advantages of their particular different uses.

The valve shown in the drawing functions as a by-pass valve to allow unrestricted flow of compressed gas from a primary supply source to an actuator, such as a turbine or the like, for a predetermined interval of time. The pressure and volume of the gas which is delivered during this time interval is limited only by the energy content of the primary source and the capacity of the connecting lines and fittings. The length of this time interval is determined by the time required to overcome starting inertia in the receiving actuator and accelerating the actuator to the desired operating speed. The energy required during this acceleration period greatly exceeds the energy supplied during normal or constant speed operation of the unit.

At the end of the full-flow time interval, it is necessary to decrease immediately the energy supplied to the actuator in order to prevent overspeeding. It is desirable also to reduce this energy input to the proper level and thereafter to maintain this energy level within close limits in order that the actuator will continue to perform at the required operating speed at the given load.

The by-pass regulating valve consists of two separate and distinct valves combined in such a manner that it becomes possible to by-pass or eliminate the function of pressure regulation for a predetermined time interval at the beginning of the operation cycle and then simultaneously to shut off the by-pass and to commence pressure regulation at a predetermined pressure level for the remainder of the operating cycle.

To understand more fully the design features of this valve, I will first describe the design of the regulating valve and then proceed to describe the by-pass valve.

As illustrated in the drawings, the regulating valve contains one or more cone disk springs 1 which are also known to the art as belleville type springs. If multiple "bellevilles" are used, $MoS_2$ may be used as a dry lubricant. The cone disk springs are interposed between a seating surface 2 and a valve plunger 3, such that the spring load urges the valve plunger 3 away from a regulating orifice 4 increasing the regulating orifice area and allowing more gas or liquid to flow through the valve. For purposes of convenience of description, the valve will be generally described as conducting gas, liquid or fuel, but it is to be understood that it is adapted to handling various types of fluids for the purposes to which the valves may be applied.

The regulating orifice 4 is carried in a floating valve seat 5 which is sealed on its outer diameter by an O ring 6. Thus, the entire flow must pass through the passage 7 through the bored center of the seat 5 and then through the regulating orifice 4 and thence to the downstream outlet port 8 of the regulating valve. It is the pressure in this downstream port 8 which I wish to control. Downstream pressure is carried through an opening 9 extending laterally through the plunger and connecting to the passageway 10 in the valve plunger 3 to the reference chamber 11. The regulating valve and by-pass valve are co-operatively contained in the valve body 12 which includes a main body portion 13 provided with a mounting flange 14, as is shown in Figure 1. The by-pass valve unit 15 is a separate entity which is threaded into the body 13 in the manner which will later be described. At the top of the body 13 is connected a cap 16 which has a center portion 17 and an outer flange 18 through which extend connecting bolts 19. The connecting bolts are screwed down into threaded holes in the valve body 13 in the manner shown in detail in Figure 3. Within the cap is the sealed reference chamber 11.

The pressure in the reference chamber 11 is, at all times, equal to the pressure in the downstream port 8. In the reference chamber 11 the pressure acts against the upper surface of the cone disk springs 1 creating a load in opposition to the normal spring load of the cone disk springs and urging the valve plunger 3 downwardly toward the regulating orifice 4 to restrict the flow of gas, liquid or fuel. The cone disk springs 1 are sealed at their outer diameter by O ring seals 20 which are positioned between the lower edge of the annular extension 21 of the cap 16 and the springs 1. The springs are sealed at their inner diameter by O ring seal 22. The O ring is placed beneath the flange 24 on the enlarged head 25 of the valve plunger. A lock ring 23 is used during assembly to hold the cone disk springs in place.

The reference chamber 11 is thus sealed off and the reference pressure from the outlet port 8 acts only on the upper surface of the cone disk springs 7, the lower surface being exposed to atmospheric pressure by means of a vent hole 26 which leads out through the valve body 13. The chamber 27 beneath the cone disk springs, which is vented to atmosphere, is sealed by an O ring 28 positioned in a groove in the valve body and surrounding the valve plunger 3. The cone disk springs thus sense the pressure difference between the reference chamber pressure and atmospheric pressure and position the valve plunger accordingly.

The reference chamber pressure will indicate the pressure at the outlet port 8 and will cause more or less deflection in the cone disk springs 1 until the valve plunger 3 is moved to position wherein the total flow area of the regulating orifice 4 is exactly equal to the area required to maintain the downstream pressure in balance with the spring load of the cone disk springs 1 (and the adjusting spring 29 as will later be described) for any given flow requirement and for any given upstream supply source pressure. The valve plunger 3 will continue to operate in this position until a change in downstream back pressure or upstream supply pressure occurs.

If the discharge pressure decreases as a result of a decrease in the resistance downstream from the regulating valve or as a result of a decrease in upstream pressure, the reference chamber pressure will decrease in equal amount. This will reduce the pressure loading on the cone disk springs 1, allowing them to move the valve plunger 3 away from the regulating orifice 4 and thus permitting a greater flow through said regulating orifice until the discharge pressure is again sufficient to balance the load on the cone disk springs at a new operating position. If the reference chamber pressure increases, the reverse effect takes place and the cone disk springs and valve plunger move closer to the regulating orifice for decreasing the regulating orifice area until the discharge pressure again balances the spring load of the cone disk springs. It is to be noted that the cone disk springs 1 are performing a two-fold purpose, not usually available in regulating valves of previous design. The springs perform the functions of spring and diaphragm by taking advantage of the unique physical shape of the cone disk springs and by provision of the seals on the outer and inner edges.

An additional advantage is obtained with this design in that the cone disk springs 1, reference chamber 11, valve plunger 3, and regulating orifice 4 are so arranged that to decrease flow, the valve plunger must move in opposition to the inertia of the fluid flowing through the regulating orifice 4. This is a design factor, highly important in high pressure, high velocity flow. If the regulating valve plunger and decreasing flow were to move in the same direction as the incoming fluid, the inertia of the fluid would be felt by the valve plunger as an additional load tending to close the valve. This would cause the valve to close much more rapidly which in turn would cause the effect of inertia to be increased. This process would result in over-travel of the valve plunger and set up the phenomena known as "water hammer" in the case of liquid fuel, or "harmonic vibration" in the case of gaseous fuel.

A provision is made for manual adjustment of the regulated pressure deliverable by the valve by the addition of a helical coil spring 29 which is enclosed in the reference chamber 11. An adjusting screw 30 adjusts the tension of the coil spring which pushes downwardly on the enlarged head 25 of the plunger 3. At the upper end of the coil spring is positioned a nut 31 having a flanged head to rest on the spring 29. The adjusting screw is rotated by means of a squared head 32 and an O ring 33 is provided between the cap 16 and the adjusting screw to prevent leakage of pressure from the reference chamber 11, and the nut 31 is threaded to the screw 30. Biasing the belleville characteristic with a helical compression spring is an important means of achieving new characteristics or adjustments not otherwise available.

If a decrease in pressure setting is desired, the adjusting screw 30 is turned in such a direction as to move the nut 31 toward the coil spring 29 causing a corresponding amount of deflection of the spring in increasing its compressive load. The compressive load of the spring acts in opposition to the cone disk spring load, thus reducing the total load acting on the valve plunger and likewise reducing the reference chamber pressure which is required to balance this new load. An increase in pressure setting is accomplished by rotating the nut in the reverse direction and thus decreasing the load on the coil spring. The adjusting nut 31 is restrained from rotation during adjustment of the adjusting screw 30 by means of a projecting pin 34, one end of which is permanently fixed to the adjusting nut and the other end of which slides in a vertical slot 35 in the cap 16.

In the embodiment illustrated some variations of pressure setting with temperature variation may be desired to compensate for change in available energy in the gas and possibly variable viscosity of bearing lubricants. This is readily accomplished by adding a bimetallic coned washer to the Belleville stack 1, thus voiding the load with temperature change. For example, the intermediate washer 62 may be bimetallic in construction to change characteristics with temperature change.

An important feature of the invention lies in the provision of the floating valve seat 5. A clearance space 36 is provided between the bottom of the shoulder 37 of the floating valve seat 5, and the retaining ring 38 which is fixed in a groove in the valve body 13. When the floating valve seat is in its upper position, which is the operative position relative to the valve stem 3, the upper surface of the shoulder 37 rests against the bottom surface of the land 39 provided in the main valve body 13. The floating valve seat 3 is shown in Figure 3 in an intermediate position but it will be forced up against the land 39 when the valve is acting as a regulating valve and will drop down to rest against the retaining ring 38 when the valve is not in use. During pressure regulating operation, the pressure at the inlet port 40, which is formed by an inlet fitting 41 threaded into the valve body 13, is always larger than the pressure at the outlet port 8 so that the resulting pressure loading on the floating valve seat constantly urges the valve seat upwardly. The land 39 accurately locates the valve seat during operation of the regulating valve plunger 3.

During the period when the valve is operating as a by-pass valve, however, this period occurring at the beginning of the operating cycle, the pressure in the discharge or outlet port 8 is substantially equal to the pressure in the inlet port 40. Since this high pressure is also carried up into the reference chamber 11, an overload is applied to the upper surface of the cone disk springs 1. This overload may be considerably higher than the permissible load which can be applied to the cone disk springs without causing permanent damage due to overstressing. To prevent this, and avoid excessive deflection of the cone disk springs, they are supported by an annular supporting surface 42 which is part of the valve body 13. The overload against the cone disk springs 1 is thus transferred to the main valve body through the surface 42 and no damage is suffered by the springs 1. Further, the supporting surface 42 is so located that it will not interfere with the normal deflection of the cone disk springs during the regulating cycle of the valve which follows immediately after the by-pass cycle. To have proper operation, it is apparent that the valve plunger 3 must contact the upper surface of the floating valve seat 5 before the cone disk spring contacts the supporting surface 42. If the overload against the cone disk springs is transferred to the floating valve seat instead to the supporting surface 42, permanent damage might result due to the small area of contact between the floating valve seat and valve plunger. Also the excessive deflection of the cone disk springs would disrupt the position of the O ring 22 allowing leakage and causing damage to the seal.

To prevent these undesirable effects, the floating valve seat is allowed to move away from the land 39 and to move forwardly with the pressure of the valve plunger 3. During operation as a by-pass valve, the only pressure between the plunger 3 and the valve seat 5 will be the upward thrust on the floating valve seat, due to the pressure differential between the upper pressure responsive surface 43 of the floating valve seat and the downwardly facing surfaces 14 and 43a of the floating valve seat 5.

When the by-pass valve closes, however, and the downstream pressure from the regulating valve is reduced, the floating valve seat will again be forced upwardly by the upstream pressure until the shoulder 37 rests against the land 39.

For by-pass operation, the fluid must flow through the second or the by-pass passageway 63 which communicates with the inlet port 40 and the outlet port 8 and leads around the flow regulating valve. To reach the by-pass passageway the fluid enters the hollow bored center 7 of the floating valve seat number 5 and flows out through the lateral openings 61 into the annular groove in the valve body 13. The by-pass passageway 63 is substantially larger than the flow control passageway which is in effect the orifice 4 leading through the floating valve seat, the valve seat being positioned in the main flow control passageway. Thus, when the fluid is free to flow to the by-pass passageway, as is permitted during the first operation of the valve to supply an initial high quantity of fluid a large amount of fluid will flow to the actuator being supplied. The function of the by-pass valve is a cyclic rather than a continuous one, since the by-pass valve functions at the beginning at each operating cycle for a definite and predetermined time interval. It then closes for the remainder of the operating cycle. At the end of the by-pass operating cycle, it automatically readjusts so as to be ready to operate for the same predetermined time interval at the beginning of the next cycle.

The by-pass passageway is provided with a stationary valve seat 44 against which seats a moving valve element 45. The valve assembly is carried as a unit on the valve plug 15, which is detachably secured to the main valve body 13 by being threaded into a threaded opening 46 in the valve body. The movable valve member carries an annular ring of seating material 47, which moves against the seat 44 when the valve member 45 is closed. The movable valve member 45 is resiliently urged toward the closed position by a cone disk spring 48.

The outer edge of the spring 48 is seated against a shoulder formed by the leading edge 59 of the cup shaped member 50 which is threaded into the opening 46 forming part of the valve assembly 15. The spring is sealed at the outer edge by being pressed against the O ring 49 which is carried in the groove at the base of the opening 46. The inner edge of the spring presses against a shoulder 51 on the movable valve member 45. The movable valve member carries an annular flange 53 and between this flange and the cone disk spring 48 is positioned an O ring 54. The spacing between the spring 48 and the flange 53 is such that the O ring will be forced in the groove when the pressures in the by-pass conduit 63 are higher than the pressures within the time delay or plenum chamber 55. When the pressure in the plenum chamber is higher, however, the fluid will escape past the spring 48 and pass the O ring 54. Thus the O ring functions as a check valve permitting the flow of fluid out of the plenum chamber into the by-pass passageway 63, but restrains the flow of fluid from the by-pass passageway 63 into the plenum chamber 55. Fluid is admitted into the plenum chamber from the by-pass passageway at a controlled rate through a small leakage passageway 56, which extends through the movable valve plunger 45.

In some instances, it may be desirable to have this leakage passage positioned in a different manner, as is shown in Figure 4. In this design, the movable valve member 45a carries the O ring 54a behind the flange 53a in the same manner as shown in Figure 3. The belleville, or cone disk, spring is thus sealed at its inner diameter and similarly is sealed at its outer diameter by being pressed against the O ring 49a. The leakage passageway is provided through the cone disk spring, however, instead of through the valve plunger 45, and this design, in many instances, provides a greater latitude for size and strength variations.

For operation of the by-pass passageway, high pressure fluid is admitted to the inlet port 40 and passes up through the passage 63. The force of the fluid acting against the pressure responsive surface 57 of the movable by-pass valve plunger 45, opens the by-pass valve to permit the high pressure fluid to flow out through the outlet port 8. At this time, the plenum chamber 55 is at a lower pressure, and therefore the pressure differential across the surface of the movable valve plunger 45 causes the plunger to move against the action of the cone disk spring 48. In operation, the high pressure compressed fluid is first admitted through the inlet port 40 through some solenoid or other quick opening valve mechanism. The high pressure fluid then acts on the exposed surface 57 of the by-pass valve, but the pressure within the plenum chamber 55 is at some lower pressure.

The cone disk spring 48 also receives the action of the high pressure fluid and is sealed at its edges to prevent the fluid from entering the plenum chamber 55. At the beginning of the by-pass valve operation, the cone disk spring 48, being subjected to the high pressure fluid acting on its surface and also sensing the force of the fluid on the exposed surface 57 of the by-pass valve, moves back to allow the valve to open. The amount of this opening is determined by stopping the deflection of the cone disk spring against the surface 60 of the cup-shaped member 50. This also limits the stress in the cone disk spring by supporting the spring and preventing any deflection beyond which is deemed to be safe.

As the high pressure fluid passes out through the outlet port 8, it also acts on the upper surface 43 of the floating valve seat 5 equalizing the forces of the pressures on the lower surfaces 14 and 43a of the seat and permitting it to back off when pushed downwardly by the valve plunger 3. Under these conditions the regulating valve performs no function and will remain in this position until the by-pass valve is again closed. This closing is accomplished after a predetermined time delay by leakage of the high pressure fluid through the leakage passageway 56. The size of this passageway and the size of the plenum chamber 55 are chosen in accordance with the physical characteristics of the fluid being used, and the compressed fluid will bleed into the plenum chamber at a rate to build up sufficient pressure to nearly balance the pressure in the by-pass chamber at the end of the predetermined time interval. This pressure balance will then allow the cone disk spring 48 to move the valve plunger 45 against the seat 44 of the by-pass port to close the by-pass passageway and stop the flow of high pressure fluid. Further flow of the fluid is then directed through the fluid control passageway out of the orifice 4 in the floating valve seat, and the flow is again regulated by the pressure control of the regulating valve mechanism.

During the time of unrestricted flow through the by-pass passageway 63, the actuating mechanism has been accelerating to operating speed in the shortest possible time, being furnished with a full supply of compressed fluid fuel. Further, if the time interval has been correctly predetermined, the speed reached at the end of the by-pass cycle is very close to the desired operating speed.

It is also apparent that if the regulating pressure has been correctly prejudged, the actuating unit will continue to operate at this speed under the given load conditions since the regulating valve will maintain this reduced regulated pressure at constant level in spite of large variations in supply pressure. After the entire operating cycle has been completed and the actuating unit has completed its run, the upstream supply pressure leading to the inlet port 40 will be cut off, and the pressure in the entire unit will reduce automatically to atmospheric or to a lower pressure level determined by equalization of static pressures in the immediate environment. Pressure in the plenum chamber 55 is likewise reduced to the same static level by reverse flow through the plenum chamber orifice 56. The reverse flow is also aided by the flow past the O ring 54 which does not seal in the reverse direction, but acts much like a check valve to prevent flow into the plenum chamber, but to permit flow out of the plenum chamber. The bleed down of the plenum chamber thus occurs very rapidly and the by-pass mechanism is immediately ready for the next operating cycle which is begun by the admission of high pressure fluid into the by-pass conduit 63.

Although the operation of the overall mechanism will have been apparent from the description of the individual elements and their relationship and co-operative operation in the valve as a whole, a summary of operation will be helpful in understanding the advantages associated with the overall mechanism.

To begin operation of the by-pass and flow control valve, fluid under pressure is first admitted through the inlet port 40. The fluid flows upwardly, as shown in Figure 3 of the drawings, into the central bored hollow center 7 of the floating valve seat 5 and passes outwardly through the lateral passages 61 into the annular groove 58 formed in the valve body 13. From the groove, the fluid flows through the by-pass passageway 63 to force the valve plunger 45 to the open position away from the seat 44 of the by-pass valve. The high pressure fluid acts on the surface 42 of the floating valve seat 5 to equalize the pressure on the lower surfaces of the floating valve seat and permit the valve seat to be moved downwardly with the plunger 3. The high pressure fluid has also entered the lateral passageway 9 in the valve plunger 3, and has passed upwardly into the reference chamber 11 and pushed downwardly on the springs 1 to move the valve plunger into the downward position whereupon the springs rests on the surface 42.

The valve will act as a by-pass valve with the plunger 45 in the open position for a period of time until sufficient fluid has leaked through the leakage passageway 56 into the plenum chamber 55. When sufficient pressure builds up within the plenum chamber after a predetermined period of time, the plunger 45 will move to the closed position and the fluid will then be directed upwardly through the orifice 4 of the valve seat. The closing of the by-pass plunger will reduce the pressure in the passageway 8 and the floating valve seat will resume its operative position relative to the plunger 3. The plunger 3 will be influenced in position by the pressure in the reference chamber 11 and the valve will then commence operating as a pressure regulating valve by controlling the opening of the orifice 4 to maintain a constant downstream pressure regardless of variations in supply pressure.

Thus, it will be seen that I have provided a multiple purpose valve which is combined into a single unit meeting the objectives and advantages hereinbefore set forth. The mechanism is reliable in operation and is not subject to failures in that each individual element is sturdy and simple in operation.

The control valve supplies an initial high flow of compressed fluid to bring the actuating mechanism to which the fluid is fed to high speed during a short initial period, and it then automatically begins operation as a pressure regulating valve. The valve is constructed to operate as a single unit and the by-pass mechanism is formed as a separate entity removably combined with the unit as a whole. The floating valve seat arrangement insures proper positioning of the seat during operation and positively prevents damage between the seat and the valve plunger during the high pressure and pressure fluctuations that occur during the by-pass cycle of operation of the valve.

I have, in the drawings and specification, presented a detailed disclosure of the preferred embodiments of my invention, but it is to be understood that I do not intend to limit the invention to the specific form disclosed but intend to cover all modifications, changes and alternative constructions and methods falling within the scope of the principles taught by my invention.

I claim as my invention:

1. A valve regulating the pressure of a compressed gas or the like comprising a valve body having a flow passageway extending therethrough between an inlet and an outlet port, a floating valve seat positioned in said passageway and movable therein, a pressure regulating valve plunger movable within the valve body to coact with said seat to control the pressure through said passageway, a by-pass passageway communicating with the inlet and outlet ports and by-passing said valve seat and regulating valve plunger, a first surface on said valve seat exposed to the upstream gas pressure in said flow passageway to force the valve seat toward operative relationship with the valve plunger, and a second pressure responsive surface on said valve seat exposed to the downstream pressure in said flow passageway and being subjected to the gas pressure when said by-pass passageway is open to equalize the pressure on the first pressure responsive surface to permit the floating valve seat to move when engaged by the valve plunger whereby excessive pressure is prevented between said valve seat and plunger, and by-pass valve means positioned in the by-pass passageway for determining whether a flow of gas will flow through said by-pass passageway.

2. A valve for regulating the pressure of a compressible fluid fuel to an engine comprising a valve body provided with an inlet and an outlet port, a fuel pressure regulating passageway extending therethrough, a pressure regulating valve means in said passageway to control the pressure of the fuel, a by-pass fuel passageway in said valve body communicating with the inlet and outlet ports, a valve member in said by-pass passageway for permitting a flow of fuel around said regulating valve means, a pressure responsive surface connected with the by-pass valve to force the valve to open position when fuel under pressure is admitted to the inlet port of said valve, a time delay pressure chamber associated with said by-pass valve, a second pressure responsive surface connected with said by-pass valve facing the time delay chamber and operative to close the valve with by-pass a predetermined pressure in said chamber, and a fuel leakage passageway leading to the time delay chamber to build up pressure therein and to cause the by-pass valve to close a period of time after fuel is admitted through said inlet port.

3. A valve for regulating the pressure of a compressible fluid comprising a valve body having a flow passageway extending therethrough between an inlet and an outlet port for maintaining a uniform fuel pressure, a valve seat movably positioned in said passageway and movable between an operative position and an inoperative position, a valve member coacting with said seat to permit a flow of fluid through said passageway in accordance with fluid pressure, pressure responsive means communicating with the downstream side of the valve seat in said in said passageway and connected to the valve member to position it with respect to the seat to obtain a uniform fluid pressure, a by-pass passageway communicating with said flow passageway upstream and downstream of the movable seat, a valve means in said by-pass passageway and adapted to open the passageway fully for an initial period to obtain a large flow of fluid and to close the passageway after a period of time, a flow orifice through said movable seat to permit the flow of fluid through said flow passageway when the valve member and movable seat are not in engagement, and fluid pressure responsive surfaces on the downstream and the upstream side of said movable seat with both of said surfaces being exposed to high pressure fluid when the by-pass valve is open, the upstream surface being exposed to high pressure fluid and the downstream surface being exposed to reduced pressure fluid to cause the movable seat to move to operative position when the by-pass valve is closed.

4. A valve for regulating the pressure of a compressed fluid fuel comprising a valve body having a large flow passageway therethrough for an initial supply of fuel, a valve in said passageway having a movable member with a first pressure responsive surface exposed to the upstream pressure of said passageway for moving the valve member toward open position, a time delay pressure chamber, said valve member having a second surface exposed to said chamber to move the valve to closed position when sufficient pressure has built up within the chamber, a cone disk spring fixed to said valve member urging it toward closed position, and a leakage passageway extending through the cone disk spring and communicating between said flow passageway and said pressure chamber to cause a leakage of sufficient fuel into the pressure chamber to move the valve member to closed position after a period of time.

5. A valve for regulating the pressure of a compressed fluid fuel comprising a valve body having a pressure regulating passageway therethrough extending between an inlet and an outlet port, a regulating valve in said passageway having a valve seat and a movable coacting valve member, cone disk springs extending between the walls of said valve body and the movable valve member, a closed pressure chamber on one side of said cone disk springs, a communicating passageway leading to said pressure chamber and connecting to said regulating passageway to permit the pressurized fuel to act on the springs as a diaphragm to effect movement of the movable valve member, and a separate adjustable biasing means connected to the movable valve member to change the bias effective on the movable valve member by the cone disk springs whereby the position of the movable valve member with respect to the fuel pressure may be adjustably changed.

6. A valve for regulating the pressure of a compressible fluid fuel to an engine in accordance with claim 2 wherein said fuel leakage passageway extends through said pressure responsive surfaces.

References Cited in the file of this patent

UNITED STATES PATENTS

| | | |
|---|---|---|
| 449,222 | Kimball | Mar. 31, 1891 |
| 1,606,803 | Lalor | Nov. 16, 1926 |
| 2,002,451 | Gray | May 21, 1935 |
| 2,041,906 | Czarnecki | May 26, 1936 |
| 2,193,659 | Whitcomb | Mar. 12, 1940 |
| 2,213,789 | Wilkins | Sept. 3, 1940 |
| 2,272,684 | Vickers | Feb. 10, 1942 |
| 2,558,687 | Krueger | June 26, 1951 |
| 2,633,148 | Kelly | Mar. 31, 1953 |
| 2,639,727 | Ray | May 26, 1953 |
| 2,707,021 | Harris | Apr. 26, 1955 |
| 2,749,935 | Heard | June 12, 1956 |
| 2,807,238 | Pilch | Sept. 24, 1957 |
| 2,847,258 | Burdick | Aug. 12, 1958 |